United States Patent [19]

Deering et al.

[11] 4,006,391
[45] Feb. 1, 1977

[54] LINEARIZED PULSE WIDTH MODULATOR

[75] Inventors: Charles S. Deering, Richardson; William G. Redmond, Dallas, both of Tex.

[73] Assignee: E-Systems, Inc., Dallas, Tex.

[22] Filed: Dec. 20, 1974

[21] Appl. No.: 535,149

[52] U.S. Cl. .............................. 318/227; 318/230; 318/231; 318/341; 318/599
[51] Int. Cl.² .......................................... H02P 5/40
[58] Field of Search .......... 318/599, 227, 230, 231, 318/341; 331/135, 136

[56] References Cited

UNITED STATES PATENTS

| | | | |
|---|---|---|---|
| 3,079,539 | 2/1963 | Guerth | 318/599 |
| 3,181,046 | 4/1965 | Sutton | 318/599 |
| 3,260,912 | 7/1966 | Gregory | 318/599 |
| 3,278,750 | 10/1966 | Eissfeldt | 318/599 |
| 3,286,192 | 11/1966 | Collings et al. | 331/136 |
| 3,343,055 | 9/1967 | Havlicek et al. | 318/434 |
| 3,396,347 | 8/1968 | Richman et al. | 331/136 |
| 3,458,789 | 7/1969 | Gray et al. | 318/599 |
| 3,538,458 | 11/1970 | Lawson | 318/341 |
| 3,560,829 | 2/1971 | Brennan | 318/599 |
| 3,700,987 | 10/1972 | Deering | 318/230 |
| 3,717,822 | 2/1973 | West | 331/136 |
| 3,760,248 | 9/1973 | Nola et al. | 318/230 |
| 3,783,408 | 1/1974 | Bird | 331/135 |
| 3,849,709 | 11/1974 | Berman | 318/230 |

*Primary Examiner*—James R. Scott
*Assistant Examiner*—John J. Feldhaus
*Attorney, Agent, or Firm*—Robert V. Wilder

[57] ABSTRACT

A typical alternating current two phase servomotor has two windings displaced 90°; these windings are normally identified as the reference winding and the control winding. Rotational direction and speed of the motor may be controlled by applying AC voltages of the proper waveform amplitude and phase relationship to these windings. When controlling the direction of rotation and speed of such alternating current servomotors in accordance with a DC error signal, pulse width modulation is utilized. The DC error signal is compared with a periodic varying function and its inverse to generate a series of pulses that are logically combined with a square wave and its complement during an enable period to generate a first and second series of pulses each having a width related to the magnitude of the error signal and coupled to energize the control winding of the alternating current servomotor. Similarly, a second periodic signal and its inverse are used to generate pulses for the reference winding. The second periodic signal is displaced 180° in phase from the first periodic signal used for the control winding above. The DC error signal is compared with the second periodic function and its inverse to generate a second series of pulses each having a width related to the magnitude of the error signal. The second series of pulses is logically combined with a square wave and its complement during an enable period to produce output pulses to the reference winding. The motor energizing signals control a power switching amplifier connected to the respective windings of the motor to be controlled and responsive to the appropriate pulse width modulated signals.

26 Claims, 7 Drawing Figures

LINEARIZED PULSE WIDTH MODULATOR

This invention relates to control of an alternating current in accordance with a DC error signal, and more particularly to pulse modulation control of an alternating current.

Alternating current motors are extensively used in control systems both in ground based applications and airborne systems. A typical application of an alternating current servomotor in an airborne application is the positioning of aircraft control surfaces, such as the aileron and the vertical and horizontal stabilizer. Although the invention will be described with reference to the control of an alternating current servomotor, it is not intended to be limited thereto.

Normally, in the use of an AC servomotor, the so-called reference winding is energized from a constant alternating current source and a variable AC voltage is applied to the control winding in order to control the functioning (e.g. speed, torque, direction of rotation, power, etc.) of the motor. With the present invention, it is also possible to control the above functions of a servomotor by applying a variable AC voltage to both the reference winding and the control winding.

When controlling the operation of an alternating current motor in accordance with a DC error signal using modulation techniques, both pulse width modulation and amplitude modulation have been employed. A pulse width modulation motor control is described and claimed in U.S. Pat. No. 3,700,987. In pulse width modulation, the magnitude of the error signal determines the width of constant amplitude pulses at a selected frequency. This is in contrast to the more commonly used amplitude modulation scheme where the magnitude of the error signal determines the amplitude of a sinusoidal voltage at a given frequency. With either pulse width modulation or amplitude modulation, the output from the modulator is applied to a power amplifier for direct control of the energization of the windings of an alternating current servomotor. With pulse width modulation, the power amplifier output transistors operate in a switching mode, i.e., the transistors operate at either saturation or cutoff. This reduces the average power dissipated in the power amplifier in comparison to the power dissipated in the power amplifier of an amplitude modulation scheme wherein the transistors continuously use power.

An additional feature of pulse width modulation in accordance with the present invention is linearizing the torque versus error signal for a constant DC supply voltage. Previous pulse width modulation control systems did not provide for such linearization. Further, another feature of the present invention is linearizing the motor torque versus error signal for a fluctuating DC supply voltage.

Another shortcoming of previous pulse width modulation control systems is the lack of control over the maximum torque provided by the servomotor. Still another feature of the present invention is to provide a pulse modulation motor control system wherein the maximum torque of a servomotor is limited for fluctuations in the DC supply and variations in the maximum error signal for controlling the motor.

In accordance with the present invention, a control system wherein an error signal indicates the desired stall torque and direction of rotation of a two phase servomotor having a reference winding and a control winding includes a generator of a first periodic signal, a second periodic signal that is the inverse of the first signal, a third periodic signal phase displaced 180° from the first signal, and a fourth periodic signal that is the inverse of the third signal. The first and second periodic signals are compared with a DC error signal to generate a series of pulses. This series of pulses is logic combined with a square wave and its complement during an enable period to generate first and second periodic output pulses to the control winding of the two phase servomotor. The third and fourth periodic signals are also compared with the error signal to generate a series of pulses that are combined with a second square wave and its complement during an enable period to generate third and fourth periodic output pulses to the reference winding of the servomotor.

In accordance with a more specific embodiment of the invention, the first and second periodic output pulses are generated by combining a square wave and its complement with results of the comparison of the first and second periodic signals with the error signal. Further, the third and fourth periodic output pulses are generated by combining a second square wave and its complement with the results of the comparison of the third and fourth periodic signals with the error signal. The second square wave is displaced 90° from the first square wave. In addition, the frequency of the first and second square waves and their complements is one-half the frequency of the four periodic signals.

Further in accordance with the invention, the first square wave and its complement are combined with an enable signal produced by comparing the first periodic function with a pre-established level as referenced to the error signal. Similarly, the second square wave and its complement are combined with an enable signal produced by comparing the third periodic function with the same pre-established level.

A more complete understanding of the invention and its advantages will be apparent from the specification and claims and from the accompanying drawings illustrative of the invention.

Referring to the drawings:

FIG. 6 is a logic diagram for generating output pulses to the reference winding of a servomotor.

Figure 1:
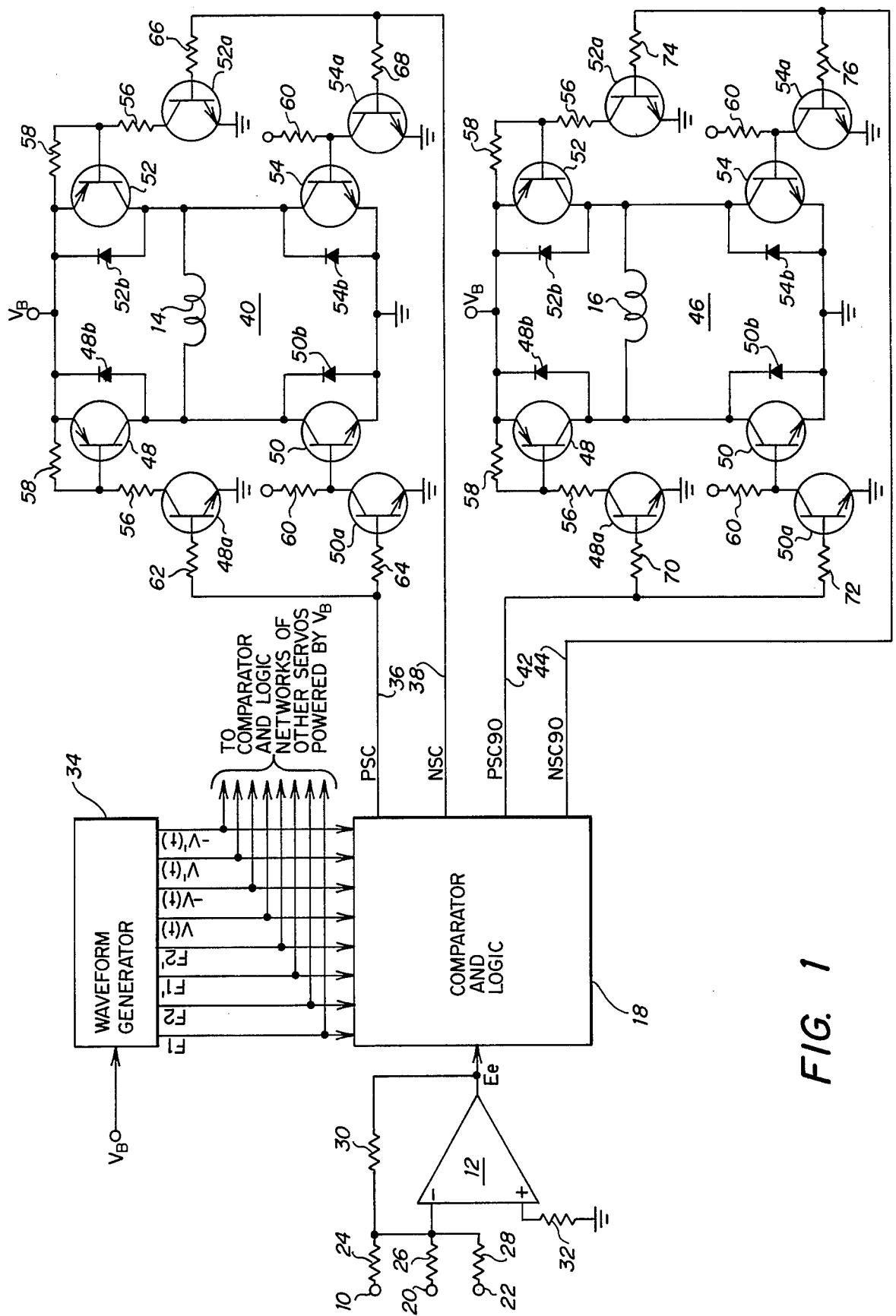
FIG. 1 is a schematic of a pulse width modulated motor control system generating periodic output pulses to both the control winding and reference winding of an alternating current two phase servomotor.

Referring to FIG. 1, there is shown a pulse width modulator wherein an electrical control signal at a terminal 10 is applied to a summing amplifier 12 having an output for energizing a servomotor having a control winding 14 and a reference winding 16 through a comparator and logic network 18. This system may be incorporated as part of the multiple servomotor actuator as described and claimed in U.S. Pat. No. 3,679,956 issued to William G. Redmond.

For the actuator described and claimed by William G. Redmond, the servomotor having windings 14 and 16 is coupled to a tachometer that responds to the speed of the motor and generates a velocity feedback signal applied to an input 20 of the summing amplifier 12. The actuator of U.S. Pat. No. 3,679,956 consists of four servomotors each having a gear drive output and all combined to develop a linear motion for driving an output device. A multiple channel linear voltage differential transformer responds to a movement of the output device and provides individual channel electrical signals which are proportional to the movement of the output device. This electrical signal from the linear voltage differential transformer is applied to an input 22 of the summing amplifier 12. Thus, the summing amplifier 12 responds to signals on the input terminals 10, 20 and 22 through respective input resistors 24, 26 and 28 to provide an error signal ($E_e$) at the output of the amplifier 12 to be applied to the comparator and logic network 18. The summing amplifier 12 is of a conventional design including a feedback resistor 30 and having a second input tied to ground through a resistor 32.

An error signal from the summing amplifier 12 is compared in the network 18 with a series of waveforms connected to the network 18 from a waveform generator 34. The waveforms from the generator 34 may be utilized by the comparator and logic networks of each servomotor of a multiple servoactuator.

Four motor control signals are generated by the logic network 18 including a "PSC" signal and an "NSC" signal on lines 36 and 38, respectively, connected to a power switching amplifier 40 for energizing the control winding 14. Also generated by the logic network 18 is a "PSC 90" signal on a line 42 and an "NSC 90" signal on a line 44 as inputs to a power switching amplifier 46 for energizing the reference winding 16.

Each of the power switching amplifiers 40 and 46 is similar and is comprised of a first power transistor 48, a second power transistor 50, a third power transistor 52 and a fourth power transistor 54 which are base controlled, power semiconductor devices. The power source for power switching amplifiers 40 and 46 is DC voltage $V_B$. The power transistors 48, 50, 52 and 54 comprise the output stage of the two transistor power amplifier whose first stage transistors 48a, 50a, 52a and 54a, respectively, drive the base electrode of the output stage. The first stage transistors 48a and 52a couple to the base electrode of the power transistor 48 and 52, respectively, through a current limiting resistor 56. For establishing the base drive to the power transistors 48 and 52, a resistor 58 is coupled in series with the resistor 56. For the power stage transistors 50 and 54, the base drive voltage is established by a resistor 60 coupled to the positive terminal of a DC source.

With reference to the power switching amplifier 40, the PSC signal on line 36 is applied to the base electrode of the first stage transistors 48a and 50a through base drive resistors 62 and 64, respectively. The NSC signal on line 38 is applied to the first stage transistors 52a and 54a of the amplifier 40 through base drive resistors 66 and 68, respectively. For the power switching amplifier 46, the PSC 90 signal, line 42, is coupled to the first stage transistors 48a and 50a through base drive resistors 70 and 72, respectively, and the NSC 90 signal on the line 44 is coupled to the first stage transistors 52a and 54a through base drive resistors 74 and 76, respectively.

As arranged, each of the power switching amplifiers 40 and 46 is basically a power bridge network with the transistors 48, 50, 52 and 54 comprising the legs of the bridge with the motor winding connected across opposite terminals of the bridge network such that when the transistors 48 and 54 are conductive the motor will be supplied current in a first direction and when the transistors 50 and 52 are conductive the motor winding will be supplied current in an opposite direction. Thus, by selectively applying base drive signals to the first stage transistors 48a, 50a, 52a and 54a the motor windings may be selectively energized to cause motor rotation in a given direction.

Because the current supplied to the motor windings is pulsed in nature, as will be explained, diodes 48b, 50b, 52b and 54b are coupled across the respective power transistors to provide a return path for circulating reactive energy trapped in the motor windings during intervals of nonconduction of the power switching transistors 48, 50, 52 and 54. These diodes allow for discharge of reactive energy in the motor winding back to the power supply which is designed to be capable of absorbing the motor inductive energy. In addition, during the intervals between the application of pulses to a motor winding, transistors 50 and 54 are maintained in a saturated condition to provide a short circuit across the winding which also allows for discharge of reactive energy.

To generate motor energizing signals on the lines 36, 38, 42 and 44 the logic network 18 generates a series of square wave signals in accordance with the torque equation:

$$T_S = KV_D^2 \sin^2 (\pi/2 \cdot PW) \qquad (1)$$

where $V_D = V_B$ less the voltage drop across two saturated transistors,

PW = the pulse width of signals applied to the motor windings 14 and 16 as given by the equation:

$$PW = T_{PW} \tfrac{1}{2} T_o = 2T_{PW}/T_o = 2T_{PW} \cdot f_o \qquad (2)$$

where $T_{PW}$ = duration of the applied pulses, $T_o$ = period of the waveform for energizing the motor windings 14 and 16, and $f_o$ = frequency of the waveforms applied to the motor windings 14 and 16.

An advantage of the circuit of the present invention is that it provides a linear stall torque, $T_S$, versus error signal, $E_e$, as given by equation (1.) If $T_s = K_1 E_e$, then:

$$K_1 E_e = KV_D^2 \sin^2 (\pi/2 \cdot PW) \qquad (3)$$

$$E_e = K_2 V_D^2 \sin^2 (\pi/2 \cdot PW) \qquad (4)$$

where $K_2 = K/K_1$.

Equation (4) is satisfied if the pulse width, PW, of a signal applied to the motor windings 14 and 16 varies in accordance with the equation:

$$PW = 2/\pi \left( \arcsin \left[ \frac{\sqrt{E_e}}{\sqrt{K_2} \, V_D} \right] \right), \qquad (5)$$

and substituting equation (2):

$$2 T_{PW} f_o = 2/\pi \left( \arcsin \left[ \frac{\sqrt{E_e}}{\sqrt{K_2 V_D}} \right] \right), \quad (6)$$

which reduces to:

$$\arcsin \left[ \frac{\sqrt{E_e}}{\sqrt{K_2 V_D}} \right] = \pi f_o T_{PW} \quad (7)$$

$$\frac{\sqrt{E_e}}{\sqrt{K_2 V_D}} = \sin \pi f_o T_{PW} \quad (8)$$

squaring both sides of equation (8) and solving for $E_e$:

$$E_e = K_2 V_D^2 \sin^2 (\pi f_o T_{PW}) \quad (9)$$
$$= K_2 V_D^2 (1/2) (1 - \cos [2\pi f_o T_{PW}]) \quad (10)$$

$$= \frac{K_2 V_D^2}{2} (1 - \cos [2\pi (2f_o) (T_{PW}/2)]) \quad (11)$$

Figure 2:
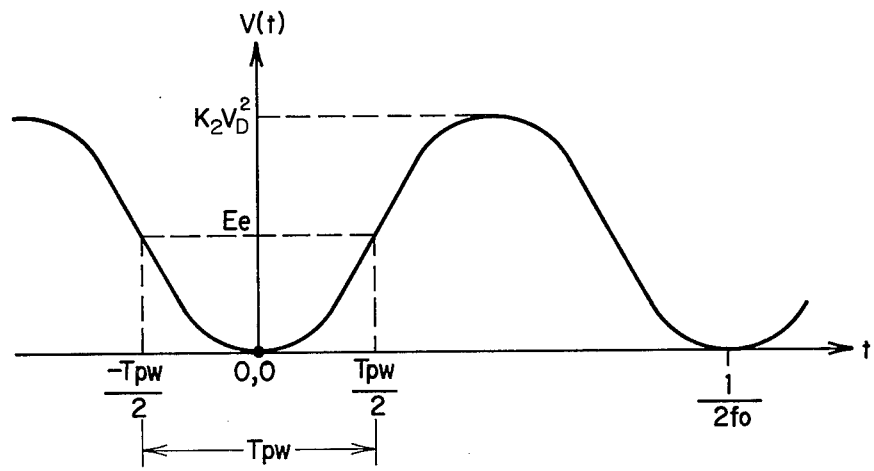
FIG. 2 is a plot of voltage as a function of time of a periodic function for generating the periodic output pulses to the control and reference windings of a two phase servomotor.

Referring to FIG. 2, there is shown a periodic function $V(t) = K_2 V_D^2/2 \{1 - \cos[2\pi (2f_o) t]\}$ that is generated and compared with the error signal $E_e$ in a comparator, the comparator output will have a periodic pulse output whose width satisfies equation (5). This is accomplished by generating the periodic function of FIG. 2 having twice the frequency of the motor signals for energizing the windings 14 and 16. That is, the output pulses generated by the logic network 18 on the lines 36, 38, 42 and 44 occur twice for every cycle of the motor signals applied to the windings 14 and 16.

Figure 3:
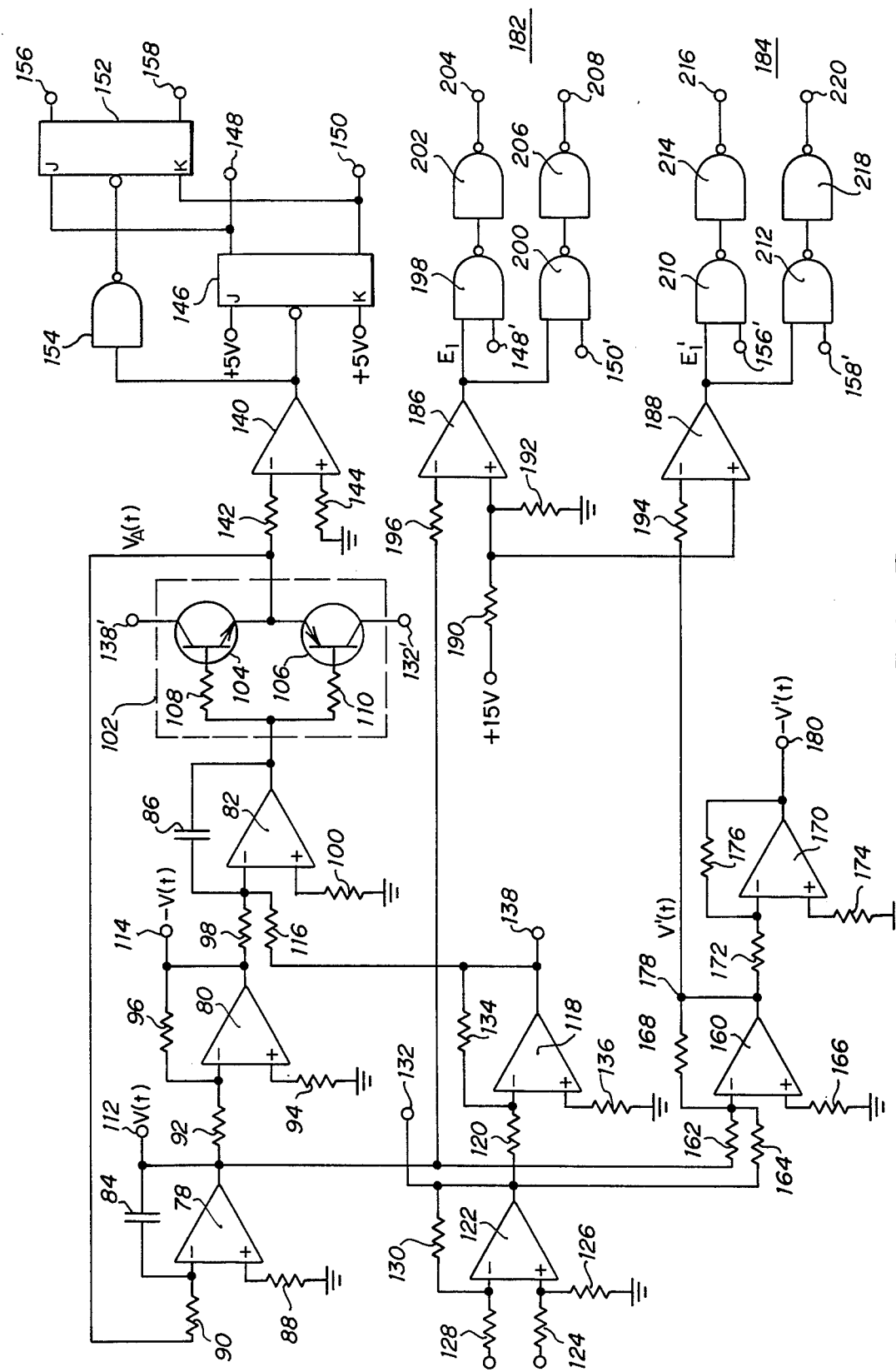
FIG. 3 is a schematic of a waveform generator for generating a first periodic function and three additional periodic functions phase displaced with reference to the first periodic function; also shown is a logic diagram for generating the first and second square waves and an enable signal.
Figure 4A:
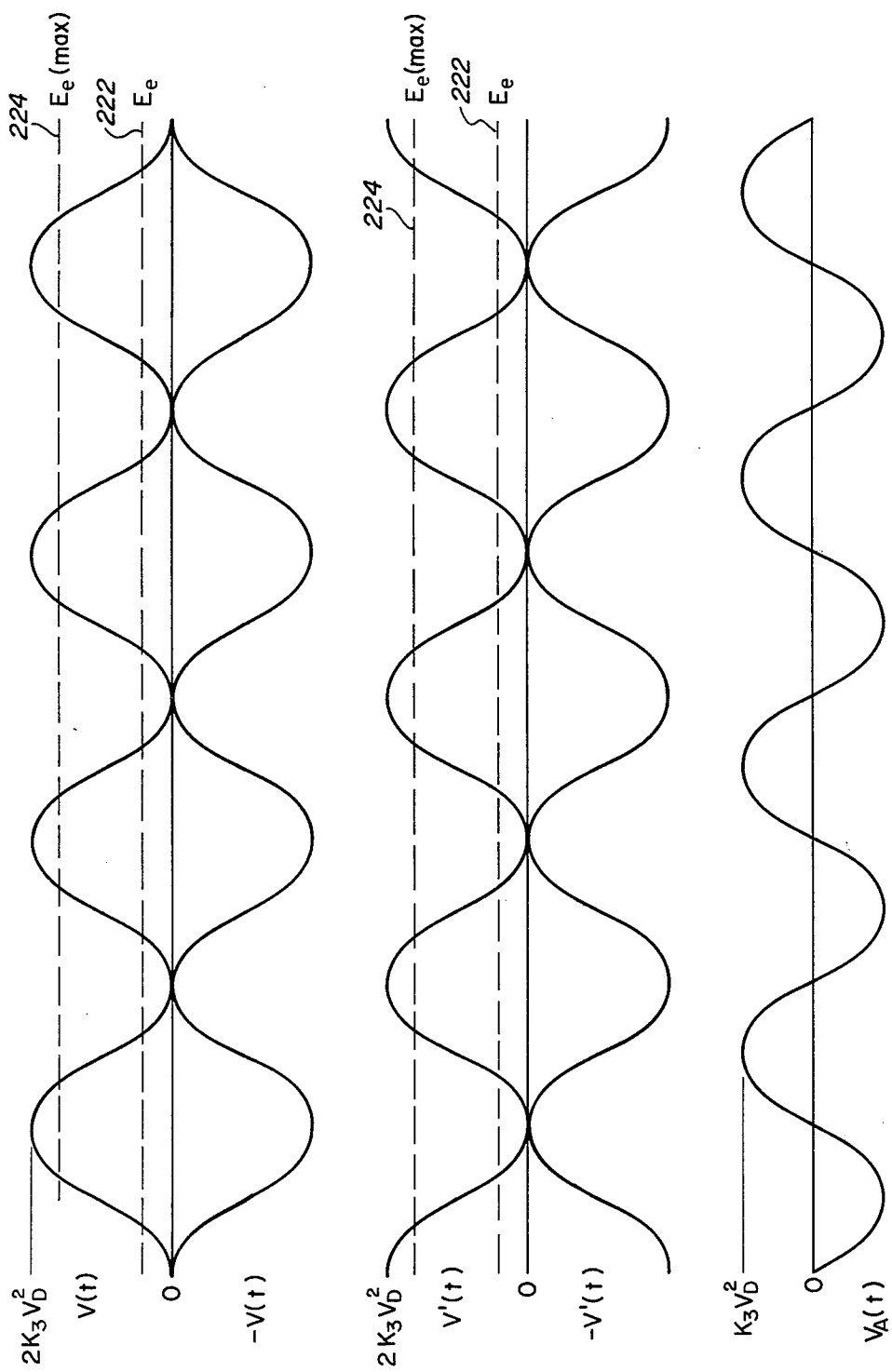
Figure 4B:
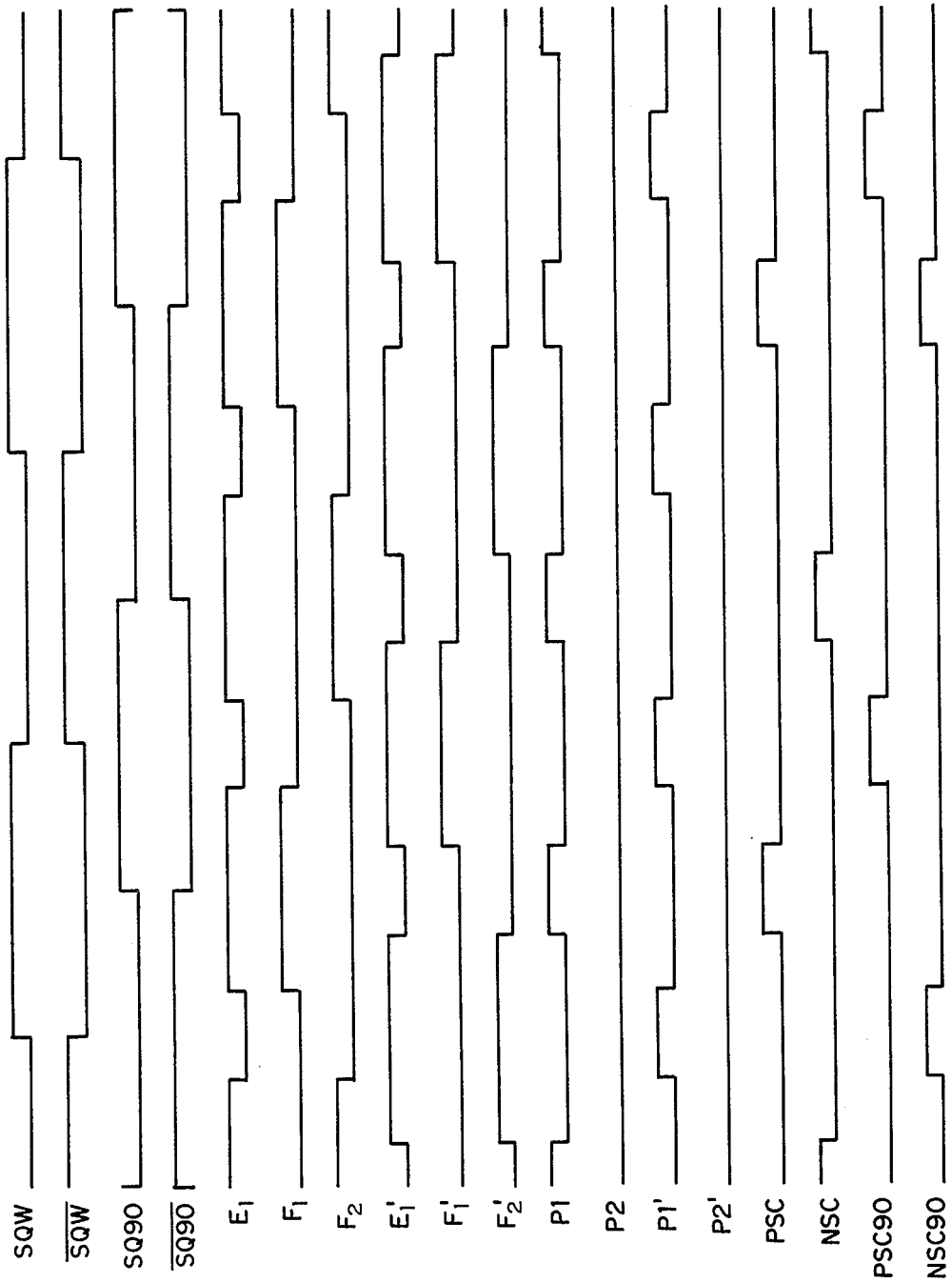

Referring to FIG. 3, there is shown the waveform generator 34 for providing wave functions $V(t)$, $-V(t)$ as given in FIG. 4 and these functions shifted in phase by 180°, respectively, that is, function $V'(t)$ and $-V''(t)$ also shown in FIG. 4.

To generate the four periodic functions of FIG. 4, three operational amplifiers 78, 80 and 82 are connected as a modified sine wave generator. As in typical operational amplifiers in current use, amplifiers 78, 80 and 82 contain an inverting input identified by the "−" symbol and a noninverting input identified by the "+" symbol. The amplifiers 78 and 82 are integrators with the feedback loop for the former including a capacitor 84 and a feedback loop of the latter including a capacitor 86. One input terminal of the amplifier 78 is coupled to ground through an input resistor 88 and a second input terminal receives a feedback signal through a resistor 90. An output from the amplifier 78 is coupled to one input terminal of the operational amplifier 80 through a resistor 92. A second input to the amplifier 80 is coupled to ground through a resistor 94. This amplifier functions as an inverter and receives a feedback signal through a resistor 96. An output from the amplifier 80 is coupled to one input of the operational amplifier 82 through a resistor 98. A second input to the operational amplifier 82 is coupled to ground through a resistor 100.

The output of the operational amplifier 82 is connected to a limiter 102 comprising transistors 104 and 106 driven through resistors 108 and 110, respectively.

The output of the limiter 102 is a sinusoidal signal at twice the energizing frequency coupled to the windings 14 and 16 with an amplitude given by $K_3 V_D^2$ where $K_3 = K_2/2$. This signal is coupled back to the input of the amplifier 78 through the resistor 90.

As connected, the output of the operational amplifier 78 at the terminal 112 is the function $V(t)$ as shown in FIG. 4 and given by the expression:

$$V(t) = K_3 V_D^2 (1 - \cos 2\pi 2f_o t) \quad (12)$$

This signal is then applied to the input of the inverting amplifier 80 that generates at an output terminal 114 the function $-V(t)$ as shown in FIG. 4 and given by the expression:

$$-V(t) = -K_3 V_D^2 (1 - \cos 2\pi 2f_o t) \quad (13)$$

To generate an offset voltage to produce the $(1 - \cos \omega t)$ type function as found in the expressions for the functions $V(t)$ and $-V(t)$, a signal as given by the expression $K_3 V_D^2$ is applied to the input of the operational amplifier 82 through a resistor 116 in parallel with the resistor 98. This voltage is generated at the output of an operational amplifier 118 having an input coupled through a resistor 120 from the output of an operational amplifier 122. One input to the operational amplifier 122 is connected to the junction of a divider network including resistors 124 and 126 with the network connected to the positive terminal of a DC supply. The second input of the operational amplifier 122 receives a voltage through an input resistor 128 equal in value to the voltage $V_B$ applied to the power switching amplifiers 40 and 46. A feedback network for the operational amplifier 122 includes a resistor 130.

The output of the amplifier 122 is a voltage that is a linear approximation of the expression $-K_3 V_D^2$ about its nominal value. The linear approximation to $-K_3 V_D^2$ is sufficiently accurate if $V_B$ does not deviate appreciably (e.g., more than ± 20%) from its nominal voltage. For larger variations of $V_B$, a more accurate approximation can be produced by any of several well known techniques. Voltage $-K_3 V_D^2$ is generated at a terminal 132 connected to the terminal 132' of the limiter 102. As previously mentioned, the output of the operational amplifier 122 is also coupled to one input of the operational amplifier 118 that is connected as an inverter with a resistor 134 in a feedback loop. A second input to the operational amplifier 118 is coupled to ground through a resistor 136. The output voltage $K_3 V_D^2$ from the amplifier 118 is applied to the amplifier 82 and also generated at a terminal 138 that is connected to the terminal 138' of the limiter 102.

With the limiter 102 coupled to the output of the operational amplifier 82 and also to the output of the operational amplifiers 118 and 122, this circuit functions to control the amplitude of the functions $V(t)$ and $-V(t)$. Further, the output of the limiter 102 is applied to a comparator amplifier 140 through an input resistor 142.

A second input to the comparator amplifier 140 is coupled to ground through a resistor 144. The output of the comparator amplifier 140 is applied to logic circuitry for generating the functions SQW, $\overline{\text{SQW}}$, $\text{SQW}_{90}$ and $\overline{\text{SQW}}_{90}$ as given in FIG. 4. These functions are utilized with enable signals as will be explained.

The output of limiter 102 is a sinusoidal signal $V_A(t)$ given by the expression:

$$V_A(t) = -K_3 V_D^2 \sin 2\pi \cdot 2f_o t \qquad (13A)$$

$V_A(t)$ has the same frequency as $V(t)$ and its phase is $-90°$ with respect to $V(t)$. The amplitude of $V_A(t)$ is established by voltages $K_3 V_D^2$ and $-K_3 V_D^2$ applied to terminals 138' and 132', respectively, as previously mentioned.

With $V_A(t)$ applied to comparator 140, the output of comparator 140 is a square wave of the same frequency as $V_A(t)$. This square wave and its complement provide triggering signals to flip-flops 146 and 152 that generate the functions SQW, $\overline{\text{SQW}}$, SQW$_{90}$ and $\overline{\text{SQW}}_{90}$.

More specifically, the output terminal of the amplifier 140 is applied to the trigger terminal of flip-flop 146 having an output terminal 148 at which there is generated the function SQW and the output terminal 150 at which is generated the function $\overline{\text{SQW}}$. The flip-flop 146 is triggered at the zero crossing in the positive direction of the sinusoidal signal $V_A(t)$ from limiter 102. These two outputs are also coupled to a flip-flop 152 having a triggering terminal connected to the output of an inverter 154. The inverter 154 connects to the output of comparator 140. Flip-flop 152 is triggered when the sinusoidal signal $V_A(t)$ from limiter 102 crosses zero in the negative direction. The flip-flop 152 has an output terminal 156 at which the function SQW$_{90}$ is generated and an output terminal 158 at which the function $\overline{\text{SQW}}_{90}$ is generated. Functions SQW, $\overline{\text{SQW}}$, SQW$_{90}$ and $\overline{\text{SQW}}_{90}$ have half the frequency of $V_A(t)$. The utilization of these functions will be explained shortly.

To generate the periodic function $V'(t)$ and $-V'(t)$ the outputs of the amplifiers 78 and 122 are coupled to separate input terminals of an operational amplifier 160 through input resistors 162 and 164, respectively. A second input to the amplifier 160 is tied to ground through a resistor 166. The operational amplifier 160 includes a feedback network of a resistor 168 coupled to the interconnection of the resistors 162 and 164.

An output of the operational amplifier 160 is coupled to an operational amplifier 170 through an input resistor 172. A second input to the amplifier 170 is coupled to ground through a resistor 174. The operational amplifier 170 functions as an inverter and includes as a feedback a resistor 176.

At the output terminal 178 of the amplifier 160 the function $V'(t)$ is generated as given by the expression:

$$V'(t) = K_3 V_D^2 (1 + \cos 2\pi \, 2f_o \, t) \qquad (14)$$

This voltage when coupled through the inverter amplifier 170 provides the function $-V'(t)$ at the output terminal 180 as given by the expression:

$$-V'(t) = -K_3 V_D^2 (1 + \cos 2\pi f_o \, t) \qquad (15)$$

To properly time the sequence for generating the motor control signals PSC, NSC, PSC90 and NSC90, enable signals are generated to the comparator and logic network 18. These enable signals are generated by the NAND gate arrays 182 and 184 connected to the output of comparators 186 and 188.

One input to comparator 186 is the function $V(t)$ as generated at the output of the operational amplifier 78. A second input to comparator 186 is a voltage for establishing a preselected triggering level related to the error signal $E_e$ for generating the enable signal $E_1$. This voltage is generated by a divider network consisting of resistors 190 and 192. This pre-established level of the error signal is also coupled to one input of comparator 188 having a second input connected to an input resistor 194 to the output of the operational amplifier 160 generating the function $V'(t)$ and generating the enable signal $E_1'$.

These enable signals are not used directly in the comparator logic network 18 but are ANDed with the square wave signal outputs of the flip-flops 146 and 152.

With reference to the comparator 186, the enable signal $E_1$ is applied to one input of NAND gates 198 and 200 of the logic 182. A second input to the NAND gate 198 is the square wave signal SQW applied to the terminal 148'. An output from the NAND gate 198 is inverted in an inverter 202 that produces an output at a terminal 204 given by the expression:

$$F1 = E_1 \cdot \text{SQW} \qquad (16)$$

Connected to a second input of the NAND gate 200 is the $\overline{\text{SQW}}$ signal from the flip-flop 146 as connected to the terminal 150'. An output from the NAND gate 200 is inverted in an inverter 206 that produces an output at a terminal 208 given by the expression:

$$F2 = E_1 \cdot \overline{\text{SQW}} \qquad (17)$$

Considering now the comparator 188, an output generated thereby is the enable signal $E_1'$ and is applied to the NAND gates 210 and 212 of the logic 184. A second input to the NAND gate 210 is the signal SQW$_{90}$ from the flip-flop 152 as connected to the terminal 156'. The output of the NAND gate 210 is inverted in an inverter 214 that generates an output signal at a terminal 216 given by the expression $F1' = E_1' \cdot \text{SQW}_{90}$. A second input to the NAND gate 212 is the signal $\overline{\text{SQW}}_{90}$ connected to the terminal 158'. An output of the NAND gate 212 is inverted in an inverter 218 that generates an output at a terminal 220 as given by the expression $F2' = E_1' \cdot \overline{\text{SQW}}_{90}$.

The purpose of the $E_1$ and $E_1'$ enable signals is to limit the torque produced by the servomotor having the windings 14 and 16. The magnitude of the error signal corresponding to this maximum torque limit is designated $|E_e(\max)|$ and is established by a divider network of resistors 190 and 192. This maximum torque limit signal $|E_e(\max)|$ is compared with the function $V(t)$ and $V'(t)$ in the comparator amplifier 186 and 188, respectively, to produce the logic enable signals $E_1$ and $E_1'$. The signal $E_1$ enables the motor signal pulses PSC and NSC to the motor winding 14 only when the maximum torque limit signal $|E_e(\max)|$ is greater than the function $V(t)$.

With reference to FIG. 4, if the error signal $E_e$ is at a level indicated by the line 222, then the torque limit signal $|E_e(\max)|$ is identified at the level of the line 224. The function of the comparator amplifiers 186 and 188 is to generate the enable signals $E_1$ and $E_1'$ only when the functions $V(t)$ and $V'(t)$, respectively, are below the line 224.

To generate the motor signals PSC, NSC, PSC90 and NSC90, the enable signals $E_1$ and $E_1'$ as combined with the square wave signals from the flip-flops 146 and 152, as given by the functions $F1$, $F2$, $F1'$ and $F2'$, are combined with the functions $V(t)$, $-V(t)$, $V'(t)$ and $-V'(t)$ in the comparator and logic network 18.

Figure 5:
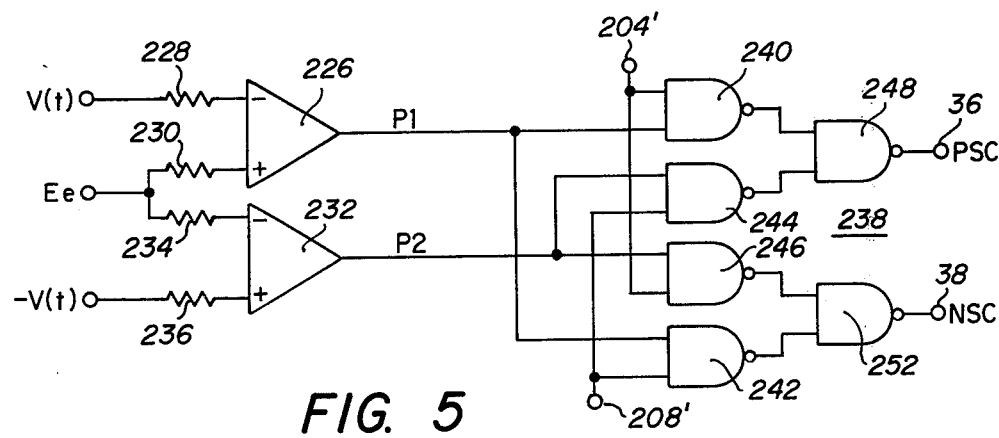
FIG. 5 is a logic diagram for generating output pulses to the control winding of a servomotor.

Referring to FIG. 5, there is shown logic for comparing the functions $V(t)$ and $-V(t)$ with the error signal $E_e$ wherein the function $V(t)$ is coupled to one input of a comparator 226 through an input resistor 228. The second input to the comparator 226 is the error signal $E_e$ applied through an input resistor 230. The error signal $E_e$ is also applied to one input of a comparator 232 through an input resistor 234. A second input to the comparator 232 is the function $-V(t)$ applied through a resistor 236.

Comparing the function $V(t)$ with the error signal $E_e$ generates the function P1 as shown in FIG. 4. The function P1 is at a logic one level if the error signal $E_e$ is equal to or greater than the function $V(t)$ and is at a logic zero level if the error signal $E_e$ is less than the function $V(t)$.

Comparing the function $-V(t)$ with the error signal $E_e$ in the amplifier 232 generates the function P2. This function is at a logic one level if the error signal $E_e$ is equal to or less than the function $-V(t)$ and at a logic zero level if the error signal $E_e$ is greater than the function $-V(t)$. For the example given in FIG. 4 where the error signal is at a level given by the line 222, the function P2 remains at the logic zero level and the function P1 varies between logic one and logic zero as the periodic function $V(t)$ cycles. This establishes the direction of energizing the control winding 14 to determine the direction of rotation of the servomotor.

To couple the functions P1 and P2 to the control winding 14, the outputs of the comparators 226 and 232 are applied to gating logic 238. An output from the amplifier 226 is applied to one input of NAND gates 240 and 242 and an output of the amplifier 232 is applied to the one input of NAND gates 244 and 246. Coupled to a second input of the NAND gates 240 and 246 is the function F1 applied to the terminal 204'. A second input to the NAND gates 242 and 244 is the function F2 applied to the terminal 208'.

By gating the functions P1 and P2 with the functions F1 and F2, respectively, the motor signals PSC and NSC are generated on the lines 36 and 38. The motor signal PSC is generated by ANDing the outputs of the NAND gates 240 and 244 in a NAND gate 248 having an output connected to the line 36. To generate the motor signal NSC, the output of the NAND gates 242 and 246 are ANDed in a NAND gate 252 having an output connected to the line 38. Given a condition for the functions $V(t)$, $-V(t)$ and the error signal $E_e$ as shown in FIG. 4, the motor signals PSC and NSC vary as shown as given by the following expression:

$$PSC = P1 \cdot E_1 \cdot SQW + P2 \cdot E_1 \cdot \overline{SQW} \qquad (18)$$

$$NSC = P1 \cdot E_1 \cdot \overline{SQW} + P2 \cdot E_1 \cdot SQW \qquad (19)$$

Figure 6:
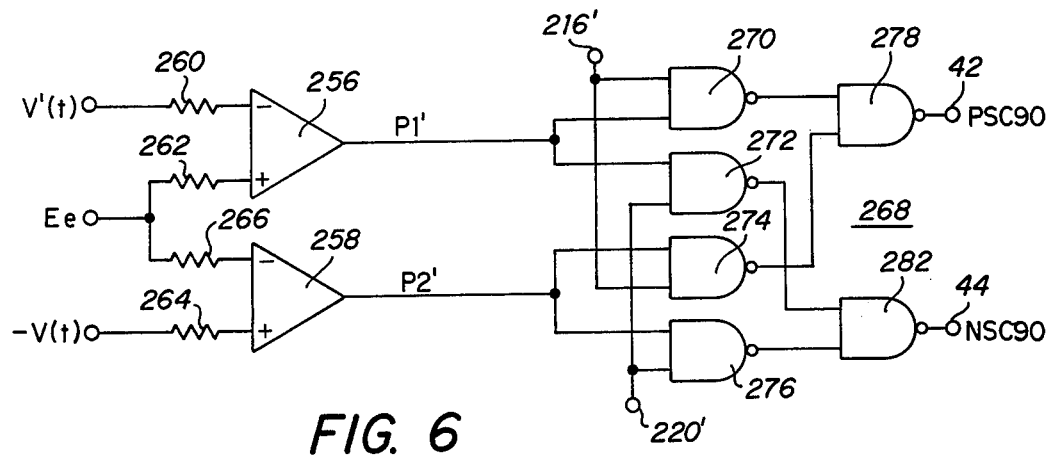
FIGS. 4 and 6 are waveforms for illustrating the operation of the circuit of FIG. 1.

Referring to FIG. 6, circuitry for producing the motor signals PSC90 and NSC90 includes comparator amplifiers 256 and 258. Coupled to one input of the comparator 256 through an input resistor 260 is the periodic function $V'(t)$ to be compared with the error signal $E_e$ applied to the second input of the comparator 256 through an input resistor 262. The periodic function $-V'(t)$ is applied to one input of the comparator 258 through a resistor 264 to be compared with the error signal $E_e$ applied to a second input of the comparator 258 through an input resistor 266. Comparing the function $V'(t)$ with the error signal $E_e$ in the amplifier 256 produces the function P1' as shown in FIG. 4 for the functions $V'(t)$ and the error signal as given by the line 222.

The function P1' at the output of the comparator 256 is equal to logic one if the error signal $E_e$ is equal to or greater than the periodic function $V'(t)$ and is at a logic zero level if the error signal $E_e$ is less than the function $V'(t)$. A comparison of the function $-V'(t)$ with the error signal $E_e$ in the comparator 258 produces the function P2' which is equal to logic one if the error signal is equal to or less than the periodic function $-V'(t)$ and is at logic zero if the error signal $E_e$ is greater than the function $-V'(t)$. For the conditions of FIG. 4, the function P2' will remain at the logic zero level. Thus, the relationship between the functions P1' and P2' establish the direction of current energization of the reference winding 16.

To energize the reference winding 16, the outputs of the amplifiers 256 and 258 are gated through logic 268. An output of the amplifier 256 is applied to one input of NAND gates 270 and 272. The output of the amplifier 258 is applied to one input of NAND gates 274 and 276. A second input to the NAND gates 270 and 274 is the function F1' applied to the terminal 216'. A second input to the NAND gates 272 and 276 is the function F2' as applied to the terminal 220'.

With the function F1' applied to the terminal 216' the outputs of the NAND gates 270 and 274 are ANDed in a NAND gate 278 and applied to the line 42. Thus, the motor signal PSC90 is generated on the line 42 by gating the NAND gates 270 and 274 with a signal on the terminal 216'. The motor signal NSC90 is provided on the line 44 by gating the NAND gates 272 and 276 with the function F2' applied to the terminal 220'. The outputs of the NAND gates 272 and 276 are ANDed in a NAND gate 282 having an output connected to the line 44.

Given the conditions of FIG. 4 for the functions $V'(t), -V'(t)$ and the error signal $E_e$ as identified by the line 222 the motor signals PSC90 and NSC90 are shown. The expressions for the motor signals PSC90 and NSC90 are given by:

$$PSC90 = P1' \cdot E_1' \cdot SQW_{90} + P2' \cdot E_1' \cdot SQW_{90} \qquad (20)$$

$$NSC90 = P1' \cdot E_1' \cdot \overline{SQW_{90}} + P2' \cdot E_1' \cdot \overline{SQW_{90}} \qquad (21)$$

An error signal $E_e$ at the output of the summing amplifier 12 is applied to the comparator logic network 18 that also receives the periodic functions $V(t)$, $-V(t)$, $V'(t)$ and $-V'(t)$ along with the functions F1, F2, F1' and F2' from the waveform generator 34 to produce the motor signals PSC, NSC, PSC90 and NSC90. The motor signals PSC and NSC as generated on the lines 36 and 38, respectively, are applied to the power switching amplifier 40 to energize the control winding 14. Similarly, the motor signals PSC90 and NSC90 as generated on the lines 42 and 44 are applied to the power switching amplifier 46 for energizing the reference winding 16. The direction of current and the time averaged magnitude of the energizing voltage to the windings 14 and 16 is determined by the error signal $E_e$.

While only one embodiment of the invention, together with modifications thereof, has been described in detail herein and shown in the accompanying drawings, it will be evident that various further modifications are possible without departing from the scope of the invention.

What is claimed is:

1. A control system wherein an error signal indicates the torque and direction of rotation of a two phase servomotor having a reference winding and a control winding, comprising in combination:
   means for generating a first periodic signal,
   means for generating a second periodic signal that is the inverse of the first signal and in response to the first periodic signal,
   first means for comparing the first periodic signal with a preestablished error signal and generating first and second enable signals,
   first means for combining the first and second enable signals with first and second square wave signals to generate first and second output signals,
   second means for comparing the error signal with the first and second periodic signals to generate first and second function signals, and
   second means for combining the first and second function signals with the first and second output signals to generate first and second periodic output pulses to the control and reference windings of the servomotor.

2. A control system as set forth in claim 1 including a switching power amplifier for coupling the periodic signals to the control and reference windings of said servomotor.

3. A control system as set forth in claim 1 wherein said second means for comparing includes:
   first and second comparator amplifiers, the first comparator amplifier responsive to the first periodic signal and the error signal, the second comparator amplifier responsive to the second periodic signal and the error signal, and
   said second means for combining includes a logic network responsive to the outputs of the first and second comparator amplifiers in response to the first output signal to generate the first periodic output pulses and responsive to the outputs of the first and second comparator amplifiers in response to the second output signal to generate the second periodic output pulses.

4. A control system as set forth in claim 3 wherein the first comparator amplifier provides an output signal when the error signal is equal to or greater than the first periodic function and the second comparator amplifier provides an output signal when the error signal is equal to or less than the second periodic function.

5. A control system wherein an error signal indicates the torque and direction of rotation of a two phase servomotor having a reference winding and a control winding, comprising in combination:
   means for generating a first periodic signal,
   means for generating a second periodic signal that is the inverse of the first signal and in response to the first periodic signal,
   means for generating a third periodic signal phase displaced 180° from the first signal and in response thereto,
   means for generating a fourth periodic signal that is the inverse of the third periodic signal and in response to the third periodic signal.
   first means for comparing the first periodic signal with a preestablished error signal and generating first and second enable signals,
   second means for comparing the third periodic signal with a preestablished error signal and generating third and fourth enable signals,
   first means for combining the first and second enable signals with first and second square wave signals to generate first and second output signals,
   second means for combining the third and fourth enable signals with the first and second square wave signals to generate third and fourth output signals,
   third means for comparing the error signal with the first and second periodic signals to generate first and second control functions,
   fourth means for comparing the error signal with the third and fourth periodic signals to generate third and fourth control functions,
   third means for combining the first and second functions with the first and second output signals to generate first and second periodic output pulses to the control winding of the servomotor, and
   fourth means for combining the third and fourth functions with the third and fourth output signals to generate third and fourth periodic output pulses to the reference winding of the servomotor.

6. A control system as set forth in claim 5 wherein:
   said third means for comparing includes;
   first and second comparator amplifiers, the first comparator amplifier responsive to the first periodic signal and the error signal, the second comparator amplifier responsive to the second periodic signal and the error signal;
   said third means for combining includes a logic network for combining the outputs of the first and second comparator amplifiers during the first enable signal to generate the first periodic output pulses, and for combining the outputs of the first and second comparator amplifiers during the second enable signal to generate the second periodic output pulses;
   said fourth means for comparing includes: third and fourth comparator amplifiers, the third comparator amplifier responsive to the third periodic signal and the error signal, the fourth comparator amplifier responsive to the fourth periodic signal and the error signal; and
   said fourth means, for combining includes a logic network for combining the outputs of the third and fourth comparator amplifiers during the third enable signal to generate the third periodic output pulses, and for combining the outputs of the third and fourth comparator amplifiers during the fourth enable signal to generate the fourth periodic output pulses.

7. A control system as set forth in claim 5 wherein the first comparator amplifier includes means for providing an output signal when the error signal is equal to or greater than the first periodic function, the second comparator amplifier includes means for providing an output signal when the error signal is equal to or less than the second periodic function, the third comparator amplifier includes means for providing an output signal when the error signal is equal to or greater than the third periodic function and the fourth comparator amplifier includes means for providing an output signal when the error signal is equal to or less than the fourth periodic function.

8. A control system wherein an error signal indicates the torque and direction of rotation of a two phase servomotor having a reference winding and a control winding, comprising in combination:

means for generating a first periodic signal, a second periodic signal that is the inverse of the first signal, a third periodic signal phase displaced 180° from the first signal, and a fourth periodic signal that is the inverse of the third signal;

means for comparing the error signal with the first and second periodic signals to generate first and second periodic output pulses to the control winding;

means for generating first and second enable signals to said means for comparing to enable the generation of the first and second periodic output pulses;

means for comparing the error signal with the third and fourth periodic signals to generate third and fourth periodic output pulses to the reference winding; and means for generating third and fourth enable signals to said second means for comparing to enable the generation of the third and fourth periodic output pulses.

9. A control system as set forth in claim 8 wherein said means for generating the first and second enable signals includes a first comparator amplifier responsive to the first periodic signal and the error signal at a pre-established level to generate the first and second enable signals; and said means for generating third and fourth enable signals includes a comparator amplifier responsive to the third periodic signal and the error signal at the pre-established level to generate third and fourth enable signals.

10. A control system as set forth in claim 9 including means connected to each of the comparator amplifiers for pre-establishing the level of the error signal.

11. A control system as set forth in claim 8 wherein said means for comparing the error signal with the first and second periodic signals includes:

first and second comparator amplifiers, the first comparator amplifier responsive to the first periodic signal and the error signal, the second comparator amplifier responsive to the second periodic signal and the error signal; and means for ANDing the outputs of the first and second comparator amplifiers in response to the first and second enable signals to generate the first periodic output pulses, and for ANDing the outputs of the first and second comparator amplifiers in response to the first and second enable signals to generate the second periodic output pulses.

12. A control system as set forth in claim 11 wherein said means for comparing the error signal with the third and fourth periodic signals includes:

third and fourth comparator amplifiers, the third comparator amplifier responsive to the third periodic signal and the error signal, the fourth comparator amplifier responsive to the fourth periodic signal and the error signal; and means for ANDing the outputs of the third and fourth comparator amplifiers in response to the third enable signal to generate the third periodic output pulses, and for ANDing the outputs of the third and fourth comparator amplifiers in response to the fourth enable signal to generate the fourth periodic output pulses.

13. A control system as set forth in claim 12 wherein the first comparator amplifier provides an output signal when the error signal is equal to or greater than the first periodic function, the second comparator amplifier provides an output signal when the error signal is equal to or less than the second periodic function, the third comparator amplifier provides an output signal when the error signal is equal to or greater than the third periodic function, and the fourth comparator amplifier provides an output signal when the error signal is equal to or less than the fourth periodic function.

14. A control system wherein an error signal indicates the torque and direction of rotation of a two-phase servomotor having a reference winding and a control winding, comprising in combination:

means for generating a first periodic signal, a second periodic signal that is the inverse of the first signal, a third periodic signal phase displaced 180° from the first signal, and a fourth periodic signal that is the inverse of the third signal;

means for comparing the error signal with the first and second periodic signals to generate first and second periodic output pulses to the control winding, and for comparing the error signal with the third and fourth periodic signals to generate third and fourth periodic output pulses to the reference winding; and means for generating enable signals to said means for comparing to enable the generation of the four periodic output pulses.

15. A control system as set forth in claim 14 including a switching power amplifier for coupling the periodic signals to the respective windings.

16. A control system as set forth in claim 14 wherein said means for comparing includes:

first and second comparator amplifiers, the first comparator amplifier responsive to the first periodic signal and the error signal, the second comparator amplifier responsive to the second periodic signal and the error signal;

means for combining the outputs of the first and second comparator amplifiers in response to an enable signal to generate the first periodic output pulses, and for combining the outputs of the first and second comparator amplifiers in response to an enable signal to generate the second periodic output pulses;

third and fourth comparator amplifiers, the third comparator amplifier responsive to the third periodic signal and the error signal, the fourth comparator amplifier responsive to the fourth periodic signal and the error signal; and means for combining the outputs of the third and fourth comparator amplifiers in response to an enable signal to generate the third periodic output pulses, and for combining the outputs of the third and fourth comparator amplifiers in response to an enable signal to generate the fourth periodic output pulses.

17. A control system as set forth in claim 14 wherein said means for generating enable signals includes:

means for generating a first square wave signal, a second square wave signal phase displaced 180° from the first square wave signal, a third square wave signal phase displaced 90° from the first square wave signal, and a fourth square wave signal phase displaced 180° from the third square wave signal;

first and second comparator amplifiers, the first comparator amplifier responsive to the first periodic signal and the error signal at a pre-established level, the second comparator amplifier responsive to the third periodic signal and the error signal at the pre-established level.

means for ANDing the outputs of the first comparator amplifier and the first square wave signal to generate a first enable signal to said means for comparing;

means for ANDing the output of the first comparator amplifier with the second square wave signal to generate a second enable signal to said means for comparing;

means for ANDing the output of the second comparator amplifier and the third square wave signal to generate a third enable signal to said means for comparing; and means for ANDing the output of the second comparator amplifier with the fourth square wave signal to generate a fourth enable signal to said means for comparing.

18. A control system as set forth in claim 17 including means coupled to the first and second comparator amplifiers of said means for generating enable signals to establish the error signal level.

19. In a control system wherein an error signal indicates the torque and direction of rotation of a two phase servomotor, a circuit for generating a first periodic signal, a second periodic signal that is the inverse of the first signal, a third periodic signal phase displaced 180° from the first signal, and a fourth periodic signal that is the inverse of the third signal, which comprises:

first means responsive to a supply voltage and generating a signal related to a linear approximation of the expression $-K_3 V_D^2$; where $K_3$ is a circuit constant and $V_D$ is related to the supply voltage, second means for generating a signal related to a linear approximation of the expression $K_3 V_D^2$, a first integrator having an input responsive to the generated signal of said first means and generating an output related thereto, an amplitude limiter having one input connected to the output of said integrator and second and third inputs responsive to the generated signals of said first and second means, respectively, a second integrator responsive to the output of said limiter and generating a first periodic signal, a first inverter connected to the output of said integrator and generating the second periodic signal to the input of said first integrator, and second and third inverters serially connected with the second inverter having an input responsive to the generated signal of said first means and the first periodic signal, said second inverter generating the third periodic signal, and said third inverter generating the fourth periodic signal.

20. A circuit as set forth in claim 19 wherein said first and second means comprise operational amplifiers, respectively, serially interconnected and each having a resistor feedback network.

21. A circuit as set forth in claim 20 wherein said amplitude limiter comprises first and second transistors having a common emitter electrode connection, the base electrode of each transistor connected to said first integrator, one of said transistors having a collector electrode as the second terminal and the second transistor having a collector electrode as the third terminal of said limiter.

22. A circuit as set forth in claim 19 including a first logic network responsive to the first periodic signal for generating motor control signals to one winding of the two phase servomotor and a second logic network responsive to the third periodic signal to generate motor control signals to a second winding of said servomotor.

23. A circuit as set forth in claim 22 including a trigger generator responsive to the output of said amplitude limiter to generate a first trigger signal, a second trigger signal that is the inverse of the first trigger signal, a third trigger signal phase displaced 180° from the first trigger signal, and a fourth trigger signal that is the inverse of the third trigger signal.

24. A circuit as set forth in claim 23 including means for connecting the first logic network to said first and second trigger signals and means for connecting the second logic network to said third and fourth trigger signals.

25. A circuit as set forth in claim 23 wherein said trigger generator includes a first flip-flop for generating the first and second trigger signals and a second flip-flop for generating the third and fourth trigger signals.

26. A circuit as set forth in claim 22 wherein said first logic network includes a comparator amplifier having one input terminal responsive to the first periodic signal and an output terminal connected to a NAND gate array, and said second logic network includes a comparator amplifier having an input terminal responsive to the third periodic signal and an output connected to a NAND gate array.

* * * * *